United States Patent [19]

Matsuo et al.

[11] Patent Number: 4,853,443

[45] Date of Patent: Aug. 1, 1989

[54] POLYCYANOARYL ETHER WITH THERMOPLASTIC RESIN

[75] Inventors: Shigeru Matsuo; Tomoyoshi Murakami; Thoru Bando, all of Chiba; Kikuo Nagatoshi, Kisarazu, all of Japan

[73] Assignee: Idemitsu Kosan Company, Limited, Tokyo, Japan

[21] Appl. No.: 118,527

[22] Filed: Nov. 9, 1987

Related U.S. Application Data

[62] Division of Ser. No. 27,629, Mar. 18, 1987, abandoned.

[30] Foreign Application Priority Data

| Mar. 25, 1986 | [JP] | Japan | 61-64746 |
| Apr. 10, 1986 | [JP] | Japan | 61-81066 |
| Jun. 23, 1986 | [JP] | Japan | 61-144917 |
| Jun. 23, 1986 | [JP] | Japan | 61-144918 |
| Jun. 24, 1986 | [JP] | Japan | 61-146038 |
| Jul. 1, 1986 | [JP] | Japan | 61-152626 |

[51] Int. Cl.$^4$ ............................................. C08L 73/00
[52] U.S. Cl. ..................................... 525/534; 525/436; 525/437; 525/463; 525/471; 525/535; 525/540
[58] Field of Search ............... 525/534, 535, 436, 437, 525/463, 471, 540

[56] References Cited

U.S. PATENT DOCUMENTS

| 4,567,248 | 1/1986 | Blinne et al. | 528/211 |
| 4,640,974 | 2/1987 | Matsuo et al. | 528/211 |
| 4,640,975 | 2/1987 | Matsuo et al. | 528/211 |
| 4,663,427 | 5/1987 | Matsuo et al. | 528/211 |
| 4,703,104 | 10/1987 | Matsuo et al. | 528/211 |

*Primary Examiner*—Harold D. Anderson
*Attorney, Agent, or Firm*—Frishauf, Holtz, Goodman & Woodward

[57] ABSTRACT

Disclosed is a novel polymer of this invention which comprises having a recurring unit represented by the formula:

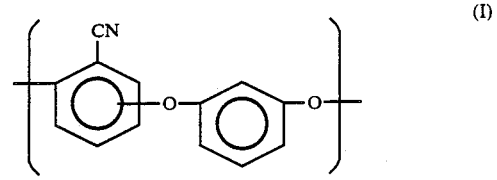

and having a reduced viscosity ($\eta$sp/c) of 0.2 dl/g or more at 60° C. in a solution of a concentration of 0.2 g/dl in p-chlorophenol as a solvent, a method for preparing the same which comprises reacting a dihalogenobenzonitrile represented by the formula:

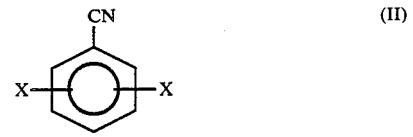

wherein X represents a halogen atom, with an alkali metal salt of resorcin represented by the formula:

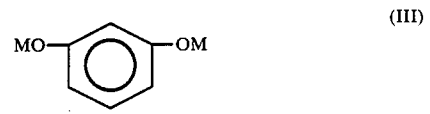

wherein M represents an alkali metal, in the presence of a solvent; and then treating the reaction product obtained by water or alcohol, and molding materials and molded products employing the polycyanoaryl ether.

5 Claims, No Drawings

POLYCYANOARYL ETHER WITH THERMOPLASTIC RESIN

This a division of application Ser. No. 27,629 filed Mar. 18, 1987, now abandoned.

BACKGROUND OF THE INVENTION

This invention relates to a polycyanoaryl ether and a method for preparing the same, more particularly, to a polycyanoaryl ether which is excellent in heat resistance, solvent resistance, flame retardancy and mechanical strength, and a method for preparing the same. Further, this invention relates to products employing the polycyanoaryl ether, that is, to a polycyanoaryl ether series resinous composition for molding; a polycyanoaryl ether stretched or oriented film which is excellent in molding workability or processability and, particularly, mechanical strength; reinforced resinous composition and thermoplastic resinous composition which are excellent in heat resistance, mechanical strength, flame retardancy and molding workability; and a laminated product which are excellent in heat resistance, flame retardancy, molding workability and chemical resistance.

In the prior art, polycyanoaryl ethers having various structures are disclosed (see Japanese Unexamined Patent Publication No. 14270/1972). This preparation method is a method in which a polycyanoaryl ether is obtained by reacting dinitrobenzonitrile with an alkali metal salt of a divalent phenol in a solvent. When resorcin is employed as a divalent phenol, high-molecular weight polymer cannot be obtained. Also, when a mixture of equal amounts of bisphenol A and resorcin is employed as a divalent phenol, the polymer obtained is not crystalline and has a problem that the heat decomposition initiating temperature is as low as 390° C. and thereby it can be said to have a sufficient heat resistance with difficulty.

Accordingly, development of a polycyanoaryl ether which is sufficiently excellent in heat resistance, as a matter of course, solvent resistance, flame retardancy and mechanical strength has been strongly demanded.

Also, although these polycyanoaryl ethers have excellent mechanical characteristics and thermal characteristics, crystallization rate is slow, whereby there is a problem that it is impossible to make a molding cycle sufficiently short at the preparation of molded products by means of a heat molding such as an injection molding.

Further, the resins which are excellent in mechanical strength and heat resistance including the polycyanoaryl ether, have a defect in molding workability or processability due to such properties and fail of having properties satisfiable in all demands. Particularly, the fact that molding workability thereof is not good leads to a problem when these resins are formed into a film.

Furthermore, thermoplastic resinous compositions containing polycyanoaryl ethers are put into wide uses because of their excellent thermal resistance and mechanical strength. However, in recent years, with more widely expanding scope of uses of such resins, there are strong demands for the development of resinous materials endowed with further excellent thermal resistance and mechanical strength as compared with those of the prior art.

Also, in the field of thermoplastic resins, particularly engineering plastics such as polycarbonate, polyester, etc. since such resins are excellent in, for example, mechanical strength, heat resistance and electrical properties, they have been put into wide uses as materials for electronic and electrical instruments, mechanical parts, etc. With more widely expanding of uses in this manner, in regard to these materials, further excellent properties are demanded and also flame retardancy is strongly demanded, particularly, from a viewpoint of insurance of safety at the time of use. As a flame retardant in this case, there may be added and mixed, for example, a metallic oxide or a halogen compound. However, when the flame retardant as described above is added to and mixed with a thermoplastic resin, there occurs problems that a weight of the composition obtained is increased to a great extent and lowering in molding workability is brought about.

Furthermore, as the material for electrical and electronic instruments or mechanical parts, laminated products obtained by impregnating and curing a thermosetting resin into a cloth or a mat comprising glass fibers or carbon fibers have been well known in the art. However, in the manufacturing steps of the above laminated products, a solvent is used to bring about worsening of the working environment, and besides the step for recovery of the solvent employed is also required. Also, a long period of heat treatment is required for curing of a thermosetting resin.

In order to cancel the problems in the case of using thermosetting resins as described above, it has been proposed to use a thermoplastic resin which is excellent in heat resistance as the constituent material of a laminated product in place of thermosetting resins.

However, of thermoplastic resins to be used, for example, a crosslinked polyethylene is insufficient in heat resistance, a polytetrafluoroethylene is inferior in molding workability, and a polyphenyleneoxide is insufficient in heat resistance and chemical resistance, thus possessing respective drawbacks, and therefore they were unsuitable as the constituent resin of a laminated product in the field of uses wherein heat resistance and chemical resistance are demanded.

SUMMARY OF THE INVENTION

A primary object of this invention is to solve the above problems and to provide a polycyanoaryl ether which is excellent in heat resistance and further excellent in solvent resistance, flame retardancy and mechanical strength, and a method for preparing the same.

An another object of this invention is to cancel such problems in the art and to provide a polycyanoaryl ether series resinous composition for molding in which productivity in preparation of a molded product of a polycyanoaryl ether has been improved, crystallization degree is high and a molded product excellent in heat resistance can be obtained therefrom.

A still another object of this invention is to cancel the problems as described above and to provide a polycyanoaryl ether stretched or oriented film not only good in molding workability but also having a specific structure provided with excellent mechanical strength.

A further object of this invention is, in order to meet such demands in the art, to provide a thermoplastic and reinforced resinous composition containing polycyanoaryl ether as a structural component of the resin and endowed with excellent heat resistance and mechanical strength.

A still further object of this invention is to cancel the problems as described above in the field of thermoplastic resins and to provide a thermoplastic resinous composition good in molding workability and at the same time having excellent flame retardancy.

An another object of this invention is to cancel the above problems by use of a novel thermoplastic resin and provide a laminated product excellent in heat resistance, mechanical strength, chemical resistance, flame retardancy and molding workability.

The present inventors have made extensive studies in order to achieve the above object and consequently found that by reacting dihalogenobenzonitrile with an alkali metal salt of resorcin in the presence of a solvent, a crystalline polymer can be obtained, to develope this invention.

A novel polymer of this invention is characterized by having a recurring unit represented by the formula:

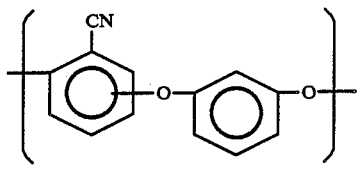

and having a reduced viscosity ($\eta$sp/c) of 0.2 dl/g or more at 60° C. in a solution of a concentration of 0.2 g/dl in p-chlorophenol as a solvent, and a method for preparing the same is characterized by reacting a dihalogenobenzonitrile represented by the formula:

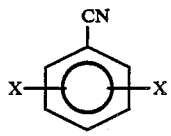

wherein X represents a halogen atom, with an alkali metal salt of resorcin represented by the formula:

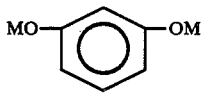

wherein M represents an alkali metal, in the presence of a solvent; and then treating the reaction product obtained by water or alcohol.

The present inventors have further found that by mixing a specific crystallizing nucleator into a polycyanoaryl ether, a resinous composition for molding which is high in crystallization degree and also capable of providing a molded product having a high heat distortion temperature can be obtained. That is, the resinous composition for molding of this invention comprises 100 parts by weight of a polycyanoaryl ether containing a recurring unit represented by the formula (I) and has a reduced viscosity ($\eta$sp/c) of 0.3 to 2.0 dl/g at 60° C. in a solution of a concentration of 0.2 g/dl in p-chlorophenol as a solvent, as a main component, and 0.01 to 3 parts by weight of at least one crystallizing nucleator selected from the group consisting of alumina, aluminum hydroxide, aluminum powder, titanium dioxide and calcium fluoride.

The present inventors have made further extensive studies in order to achieve the above object and obtain good resinous stretched film and consequently found that a polycyanoaryl ether with a structure represented by the formula (I) is excellent in molding workability and also excellent in mechanical strength by means of stretching, to accomplish this invention.

That is, the polycyanoaryl ether stretched film of this invention comprises a molded film of polycyanoaryl ether having a recurring unit represented by the formula (I) and having a reduced viscosity ($\eta$sp/c) of 0.5 to 3.0 dl/g at 60° C. in a solution of a concentration of 0.2 g/dl in p-chlorophenol as a solvent and having been stretched at a stretching ratio of 1.5 times or more.

The present inventors have made extensive studies in order to achieve the above object and obtain the thermoplastic and reinforced resinous composition excellent in heat resistance and mechanical properties and consequently found that by mixing a polycyanoaryl ether having a specific structure represented by the formula (I) and having a reduced viscosity ($\eta$sp/c) of 0.3 dl/g or more at 60° C. in a solution of a concentration of 0.2 g/dl in p-chlorophenol as a solvent and a fibrous reinforcing material in a predetermined amount, heat resistance and mechanical strength becomes more excellent, to accomplish this invention.

That is, the thermoplastic and reinforced resinous composition of this invention comprises 40 to 95% by weight of a polycyanoaryl ether having a recurring unit represented by the formula (I) as a main component and 5 to 60% by weight of a fibrous reinforcing material.

The present inventors have made extensive studies in order to achieve the above object and obtain the other thermoplastic resinous composition having good molding workability and at the same time excellent flame retardancy and consequently found that by mixing a thermoplastic resin and a polycyanoaryl ether having a specific structure represented by the formula (I) in a predetermined amount, excellent flame retardancy can be obtained without lowering molding workability, to accomplish this invention.

That is, a thermoplastic resinous composition of this invention comprises 10 to 90% by weight of a polycyanoaryl ether containing a recurring unit represented by the formula (I) and having a reduced viscosity ($\eta$sp/c) of 0.3 dl/g or more at 60° C. in a solution of a concentration of 0.2 g/dl in p-chlorophenol as a solvent, as a main component and 10 to 90% by weight of a thermoplastic resin.

Furthermore, the present inventors have studied in order to achieve the above object and obtain the laminated product described above and consequently found that the laminated product obtained by laminating a layer of a polycyanoaryl ether having a specific structure described below and a layer of a fibrous reinforcing material is excellent in heat resistance, mechanical strength, chemical resistance, flame retardancy and molding workability, to accomplish this invention.

That is, the laminated product of this invention comprises a layer of a polycyanoaryl ether having a recurring unit represented by the formula (I) and having a reduced viscosity ($\eta$sp/c) of 0.3 dl/g or more at 60° C. in a solution of 0.2 g/dl in p-chlorophenol as a solvent and a layer of a fibrous reinforcing material laminated on one another.

PREFERRED EMBODIMENTS OF THE INVENTION

A novel polymer of this invention is a polymer in which its fundamental skeleton is composed of a plurality of straight joined recurring units of the formula (I)

and both ends thereof are blocked with —H, —OH, —Cl, —F, —CH₃,

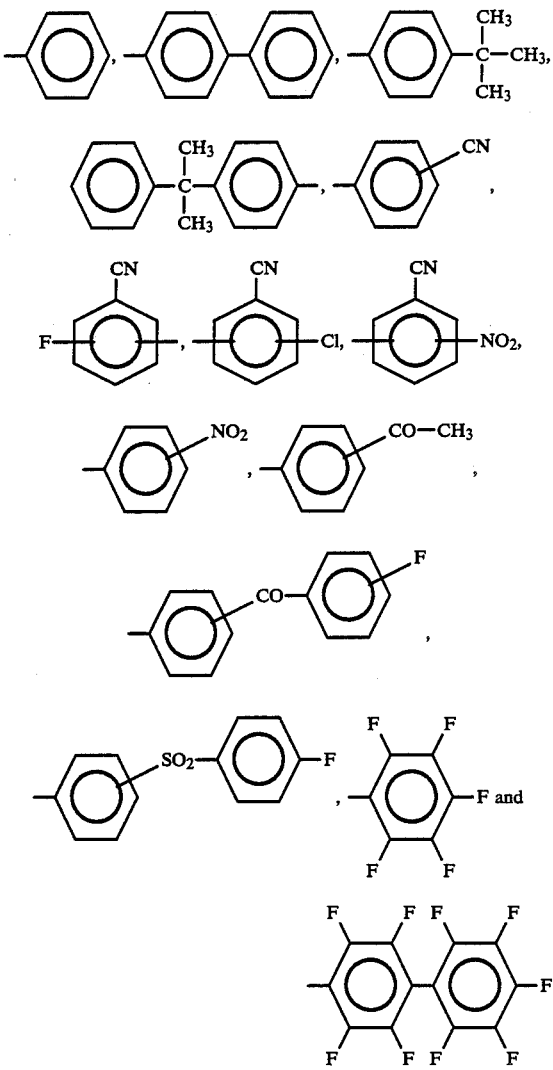

The polymer of this invention is a polymer having such a molecular weight that its reduced viscosity (ηsp/c) is 0.2 dl/g or more at 60° C. in a resinous solution which has been prepared by dissolving the polymer in p-chlorophenol so that its concentration may be 0.2 g/dl. Hereinbelow, the definition of the reduced viscosity is the same as mentioned above. When having such a polymerization degree that the reduced viscosity is less than 0.2 dl/g, heat resistance and mechanical strength will be small and thus poor in utility.

The polymer of this invention can be prepared as shown below.

That is, a dihalogenobenzonitrile represented by the formula (II) and an alkali metal salt of resorcin represented by the formula (III) are dissolved in a solvent as described hereinafter, and they are allowed to react with each other under conditions as described hereinafter.

As the dihalogenobenzonitrile, there may be preferably used 2,4-dihalogenobenzonitrile and 2,6-dihalogenobenzonitrile.

As the halogens X in the compound of the formula (II), Chlorine and Fluorine are particularly preferred.

In the compound of the formula (III), M may be an alkali metal, but Sodium and Potassium are particularly preferred. The compound of the formula (III) may be prepared by a neutralization reaction of resorcin with an alkali metal salt such as sodium carbonate, sodium hydrogencarbonate, potassium carbonate, potassium hydrogencarbonate and potassium hydroxide.

In proceeding the reaction, for example, resorcin and such an alkali metal salt as mentioned above may be added together in the reaction system instead of using the compound of the formula (III) at the start of the reaction. In this case, the compound of the formula (III) will be produced in the reaction system with the progress of the reaction.

Amounts of the compound of the formula (II) and the compound of the formula (III) to be used are determined by the relation with a polymerization degree of the desired polymer. Both the compounds are preferably employed in substantially equimolar amounts, but even if not equimolar, there is no inconvenience. Here, "substantially equimolar amounts" means a molar ratio of the compounds of the formulae (II)/(III) is 0.9 to 1.1. Preferably, the molar ratio is between 0.98 to 1.02.

The reaction is carried out in a solvent. As the solvent to be used, there may be mentioned aprotic polar solvents, for example, neutral solvents containing no sulfur, preferably nitrogen-containing compounds, specifically N-methylpyrrolidone, dimethylacetamide, dimethylimidazolidinone, dimethylformamide, N-ethylpyrrolidone, diethylacetamide, diethylformamide, etc. The amount to be used may be an amount which is sufficient to dissolve the respective compounds of the formula (I) and the formula (III).

A reaction temperature is 140° to 350° C., preferably 160° to 300° C., and a reaction time is 1 to 6 hours, preferably 2 to 4 hours. Further, the reaction may be carried out under ordinary pressure or pressurized conditions.

In this process, it is preferable to add, as a molecular weight modifier, a monovalent phenol represented by the formula:

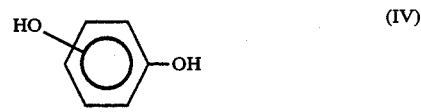

(IV)

(wherein R represents any of a hydrogen atom, an alkyl group having 1 to 10 carbon atoms, an aryl group, an aralkyl group or a cyano group), a halogenated hydrocarbon or a silicon compound.

As the monovalent phenol represented by the formula (IV), there may be mentioned, for example,

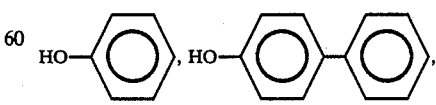

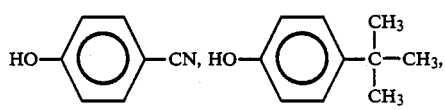

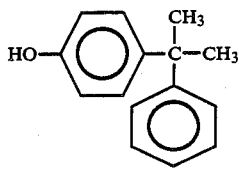

As the halogenated hydrocarbon, there are exemplified methylchloride, 2-fluorobenzonitrile, 4-fluorobenzonitrile, 2-fluorobenzophenone, 4-chlorodiphenylsulfone, 2,4-difluorobenzonitrile, 2,6-difluorobenzonitrile, pentafluorobenzonitrile, hexafluorobenzonitrile, 6-chloro-2-nitrobenzonitrile, decafluorobiphenol, 4'-fluoroacetophenone, 2', 4'-difluoroacetophenone, pentafluoroacetophenone, 2,4'-difluorobenzophenone, 4,4'-difluorodiphenylsulfone, 1-fluoro-2-nitrobenzene, 2,4-difluoronitrobenzene, etc.

As the silicon compound, there are exemplified dichloromethylsilane, dichloromethylphenylsilane, phenyltrichlorosilane, triphenylchlorosilane, triphenylfluorosilane, etc.

Further, as amount of the molecular weight modifier to be used is determined by the relation with a molecular weight of the desired polymer.

Next, the reaction product obtained through the above process is treated with water or an alcohol in order to eliminate the alkali metal present at terminals of the reaction product and substitute by H or OH. As the alcohols, methanol and ethanol are preferred, and as a treatment method, the above reaction product may be only thrown into water or the alcohol.

When dichlorobenzonitrile is used as the dihalogenobenzonitrile, it is preferred to further react the polycyanoaryl ether obtained by reacting dichlorobenzonitrile with an alkali metal salt of resorcin, with difluorobenzonitrile.

According to another embodiment of this invention, the polycyanoaryl ether to be used for obtaining the polycyanoaryl ether series resinous composition for molding of this invention has a recurring unit represented by the formula (I) and has a reduced viscosity ($\eta sp/c$) of 0.2 dl/g or more, preferably of 0.3 to 2.0 dl/g.

The crystallizing nucleator which can be used in this invention may be at least one selected from the group consisting of alumina, aluminum hydroxide, aluminum powder, titanium dioxide and calcium fluoride. These crystallizing nucleators can cause crystallization, when a polycyanoaryl ether which is in a fused state is cooled in a mold, without taking a long period of induction. On the contrary, kaolin, talc, mica, silica, calcium carbonate, a metal salt of an aliphatic acid and the like which are frequently used for polyester exhibits no effective action upon the crystallization of a polycyanoaryl ether.

The amount of the above crystallizing nucleator to be mixed is 0.01 to 3 parts by weight, preferably 1 to 3 parts by weight based on 100 parts by weight of the polycyanoaryl ether. If it is less than 0.01 part by weight, the effect of this invention is not exhibited. When exceeding 3 parts by weight, lowering in mechanical strength is brought about.

Further, there may preferably be employed a crystallizing nucleator having an average particle size of 20 m$\mu$ to 10$\mu$.

In the resinous composition for molding of this invention, there may be contained a reinforcing filler such as glass fiber and carbon fiber, an antioxidant, an ultraviolet inhibitor, a lubricant, a mold release agent, a coloring agent or an inorganic filler such as talc and mica.

The resinous composition for molding of this invention is obtained preferably by melt blending the above mixture by use of a kneader with two or more screws rotating in the same direction or different directions or an extruder with a single screw moving back and forth reciprocatively together with its rotation to disperse a crystallizing nucleator uniformly.

The resinous composition for molding thus obtained is optionally formed into pellets and hot-press molding such as injection molding is effected to prepare a molded product.

By using the crystallization nucleator, a crystallization rate becomes high even if a mold temperature on injection molding is set low. Therefore, a molding cycle becomes short and the productivity of the product is improved.

The crystallization degree and the heat distortion temperature of the molded product which has been injection molded can be improved particularly without annealing.

According to still another embodiment of this invention, in order to obtain the polycyanoaryl ether stretched film, this polycyanoaryl ether is required to have a reduced viscosity ($\eta sp/c$) of 0.5 to 3.0 dl/g. When the reduced viscosity is less than 0.5 dl/g, the effect by means of stretching described below cannot be exhibited, and when the reduced viscosity exceeds 3.0 dl/g, a stretched film cannot be obtained. Preferably, it should be 0.7 to 2.0 dl/g.

The polycyanoaryl ether stretched film of this invention is prepared by further stretching a film molded by subjecting the above polycyanoaryl ether to press or extrusion process.

That is, the polycyanoaryl ether is first molded to a film form. This step may be carried out by applying a conventional method, e.g., press molding method or extrusion molding method, etc. Then, the molded film obtained is stretched. In stretching the molding, any of monoaxial stretching, simultaneous biaxial stretching or biaxial stretching after monoaxial stretching may be carried out. In any of the above stretching methods, however, the stretching ratio is required to be 1.5 times or more. Namely, in the case of monoaxial stretching, a length ratio to stretched direction should be 1.5 times or more, while an area ratio should be 1.5 times or more in the case of biaxial stretching. If the stretching ratio is less than 1.5 times, a sufficient mechanical strength could not be undesirably provided in the stretched film obtained. The stretching ratio is preferably 4 to 9 times. A stretching temperature is 150° to 210° C., preferably 160° to 190° C.

Moreover, it is preferable that the stretched film thus obtained may be stabilized by thermal fixing. Such a thermal fixing may be effected by keeping the stretched film under tension at the temperature of 240° to 300° C., preferably 260° to 290° C. The thermal fixing time is 1 second to 10 minutes, preferably 0.5 to 2 minutes.

According to further embodiment of this invention, the polycyanoaryl ether to be used for obtaining the reinforced resinous composition of this invention preferably has a polymerization degree such that, for example, a reduced viscosity ($\eta sp/c$) is 0.3 dl/g or more. If it is less than 0.3 dl/g, heat resistance and mechanical strength will be small, thereby being poor in utility. More preferably, it should be 0.5 dl/g.

On the other hand, as a fibrous reinforcing material which is the other component of the reinforced resinous composition of this invention, there may be mentioned carbon fiber, glass fiber, alumina fiber, aromatic polyamide fiber, etc. Carbon fiber and glass fiber are particularly preferred. The carbon fiber may be either of polyacrylonitrile series, pitch series or cellulose series. These fibrous reinforcing materials may further be either continuous fiber or non-continuous fiber. For example, roving, chopped fiber or milled fiber, etc. may be used preferably.

These fibrous reinforcing materials may be those generally used as a resinous reinforcing material. The aspect ratio thereof is 100 or higher, preferably 200 or higher.

The reinforced resinous composition of this invention is obtained by mixing the polycyanoaryl ether and the fibrous reinforcing material described above, followed by kneading. In this step, the amount of the above fibrous reinforcing material to be mixed is 5 to 60% by weight based on the total amount of the reinforced resinous composition. If the amount of the fibrous reinforcing material to be mixed is less than 5% by weight, no sufficient effect of improving heat resistance and mechanical strength can be obtained. On the other hand, if it exceeds 60% by weight, the polycyanoaryl ether will not be desirably distributed through the voids of fibrous reinforcing materials, disadvantageously. Preferably, it should be 20 to 50% by weight. As to the conditions of the melt kneading in this step, the temperature is 330° to 400° C., preferably 340° to 360° C. and the kneading time is 0.5 to 5 minutes, preferably 1 to 3 minutes.

In this step, in order to accelerate a crystallization of the polycyanoaryl ether, there may be optionally added alumina, titania, aluminum hydroxide, calcium fluoride, aluminum powder, titanium dioxide, etc. The amount to be added in this step should be 10% by weight or less relative to the reinforced resinous composition.

Further, there may be added those which are used for usual molding of resins.

According to still further embodiment of this invention, the polycyanoaryl ether for obtaining the thermoplastic resinous composition of this invention preferably has, for example, a reduced viscosity ($\eta sp/c$) of 0.3 dl/g or more.

Further, as the thermoplastic resin according to this invention, there may be mentioned polycarbonate, polyethylene terephthalate, polybutylene terephthalate, polyether ketone, polyether ether ketone, polyethersulfone, polysulfone, polyetherimide, polyamidoimide, polyphenylene sulfide, etc. and particularly, polyether ether ketone, polyether ketone and polyphenylene sulfide are preferred.

The thermoplastic resinous composition of this invention is obtained by mixing the above thermoplastic resin with the above polycyanoaryl ether. The amount of the polycyanoaryl ether to be mixed is 10 to 90% by weight based on the total amount of the desired thermoplastic resinous composition. If the amount of the polycyanoaryl ether to be mixed is less than 10% by weight, flame retardancy will be insufficient. On the other hand, even if exceeding 90% by weight, flame retardancy will be improved no more.

In preparing the thermoplastic resinous composition of this invention, the thermoplastic resin may be mixed into the polycyanoaryl ether at a proportion described above, followed by melt kneading. The temperature in this step is 320° to 410° C., preferably 330° to 370° C. and the kneading time is 0.5 to 5 minutes, preferably 1 to 3 minutes.

Further, in this step, there may be optionally mixed a fibrous reinforcing material, an inorganic filler and various additives which are used for molding of resins. As a fibrous reinforcing material, there may be mentioned glass fiber, carbon fiber, polyamide fiber, etc. and it may be mixed in an amount within the range of 50% by weight or less based on the thermoplastic resinous composition. As an inorganic filler, there may be mentioned $TiO_2$, $Al_2O_3$, $SiO_2$, $CaF_2$, etc. and it can be mixed in an amount within the range of 40% by weight or less based on the thermoplastic resinous composition. Further, additives which are used for molding of resins, such as a coloring agent, a lubricant, an antioxidant, an ultraviolet inhibitor, etc. may be mixed in an usual amount to be added.

According to the another embodiment of this invention, the polycyanoaryl ether which is a component of the laminated product in this invention preferably has a reduced viscosity ($\eta sp/c$) of 0.3 dl/g or more.

Next, the fibrous reinforcing material which is the other constituent component of the laminated product may be any of those conventionally known, and there may be mentioned, for example, glass fibers, carbon fibers, aromatic polyamide fibers, etc. These fibrous reinforcing materials may be used in the form of chopped strand mat, continuous long fiber mat, woven fabric or knitted fabric, etc., or two or more kinds of these may suitably be combined.

The laminated product of this invention can be obtained by laminating the above polycyanoaryl ether and the above fibrous reinforcing material. The amount of the polycyanoaryl ether to be used may generally be 20 to 85% by weight, preferably 30 to 80% by weight and therefore, the amount of the fibrous reinforcing material formulated may generally be 15 to 80% by weight, preferably 20 to 70% by weight, and the mechanical strength of the laminated product will be lowered if the used amount falls outside of this range.

Next, as the method for preparation of the laminated product, there may be mentioned:

(1) the method in which powder or pellets of a polycyanoaryl ether are sprayed uniformly on a mat or a woven fabric of the above fibrous reinforcing material and heat and pressure molded;

(2) the method in which a sheet is formed by extrusion molding or compression molding, etc. from the pellets of a polycyanoaryl ether, and this sheet of the polycyanoaryl ether and a mat or woven fabric of the above fibrous reinforcing material are laminated and heat and pressure molded;

(3) the method in which the above methods (1) and (2) are suitably combined, etc.; but it is possible to employ any method if it can laminate the polycyanoaryl ether and the fibrous reinforcing material by the known method.

A structure or thickness of the laminated product of this invention produced according to the method as described above may be determined depending on uses and not particularly limited.

Further, since the contact interface of the laminated product of this invention is prepared by heat and pressure molding, a fused portion of the polycyanoaryl ether is fixed to the layer of the fibrous reinforcing material in slightly immersed conditions.

As is apparent from the above description, the polymer of this invention and its products are excellent in heat resistance, solvent resistance, flame retardancy, mechanical strength, chemical resistance, molding workability and solvent resistance. Therefore, it is useful as materials for electrical and electronic instruments or various mechanical parts and its industrial value is great.

[EXAMPLE 1]

In a separable flask of 300 ml-inner volume equipped with a fractionating device, a stirrer and an argon gas blowing pipe, 17.201 g (0.1 mole) of 2,6-dichlorobenzonitrile, 11.01 g (0.1 mole) of resorcin, 14.51 g (0.105 mole) of anhydrous potassium carbonate, 100 ml of N-methylpyrrolidone and 50 ml of toluene were charged. A reaction was then carried out at 190° C. for 3 hours while an argon gas was blowing thereinto. After completion of the reaction, the product was thrown into methanol to separate a polymer and then pulverized by use of a blender produced by Warning Co.. Then, the pulverized substance was washed three times with 500 ml of water and thereafter washed twice with 500 ml of methanol. Next, by drying at 120° C. for 8 hours, a polymer was obtained. The amount was 20 g and the yield was 96%.

As a result of an infrared ray absorption spectra (IR) analysis of this polymer, there were observed absorptions due to a C-H bond of the benzene ring at 3030 cm$^{-1}$ and 830 cm$^{-1}$, a C-C bond of the benzene ring at 1590 cm$^{-1}$, an aromatic ether bond at 1240 cm$^{-1}$ and nitrile at 2220 cm$^{-1}$, respectively.

First, a reduced viscosity ($\eta$sp/c) of the polymer at 60° C. in a solution of a concentration of 0.2 g/dl in p-chlorophenyl as a solvent was measured. In Examples and Comparative examples described hereinbelow, the same measurements were effected.

As to thermal properties, a glass transition temperature (Tg), a melting point (Tm), a heat decomposition initiating temperature (Td) in air were measured, respectively.

As to mechanical properties, yield strength, breaking strength, tensile modulus and elongation were measured according to ASTM D637.

As to the solvent resistance, it was found to be insoluble in the respective solvents of ethanol, acetone, toluene, methylene chloride and chloroform.

As to the flame retardancy, the film of this polymer was subjected to the flame of a lighter for 10 seconds and thereafter the flame was moved away, the fire was extinguished soon and no melt dripping was favorably observed.

The results of the reduced viscosity, thermal properties and mechanical properties of this polymer are shown in Table 1.

[EXAMPLE 2]

The reaction was carried out in the same manner as in Example 1 except for using as a solvent 100 ml of 1,3-dimethylimidazolidinone in place of N-methylpyrrolidone, and conducting a polymerization reaction at a reaction temperature of 215° C. for 2 hours. The amount of the polymer was 20.5 g and the yield was 98%. The same results as those in Example 1 were obtained in the IR analysis, solvent resistance and flame retardancy. The results of the reduced viscosity, thermal properties and mechanical properties of this polymer are shown in Table 1.

[EXAMPLE 3]

The reaction was carried out in the same manner as in Example 1 except for using 13.92 g (0.1 mole) of 2,6-fluorobenzonitrile in place of 2,6-dichlorobenzonitrile. The amount of the polymer obtained was 20.9 g and the yield was 100%. The same results as those in Example 1 were obtained in the IR analysis, solvent resistance and flame retardancy. The results of the reduced viscosity, thermal properties and mechanical properties of this polymer are shown in Table 1.

[EXAMPLE 4]

The reaction was carried out in the same manner as in Example 1 except for using as a molecular weight modifier 0.17 g (0.001 mole) of phenylphenol. The amount of the polymer obtained was 19.9 g and the yield was 95% The same results as those in Example 1 were obtained in the IR analysis, solvent resistance and flame retardancy. The results of the reduced viscosity, thermal properties and mechanical properties of this polymer are shown in Table 1.

[EXAMPLE 5]

In a reactor of 300 ml-inner volume equipped with a fractionating device, a stirrer and an argon gas blowing pipe, 25.801 g (0.15 mole) of 2,6-dichlorobenzonitrile, 16.516 g (0.15 mole) of resorcin, 26.461 g (0.315 mole) of sodium hydrogencarbonate, 150 ml of N-methylpyrrolidone and 70 ml of toluene were charged. Dissolution was effected at room temperature while an argon gas was blowing. Then, the reactor was placed in an oil bath and the temperature was elevated up to 200° C. over 40 minutes. A reaction was then carried out at 200° C. for 3 hours while an argon gas was blowing thereinto. After completion of the reaction, into the solution containing the product, a solution in which 0.261 g (0.0019 mole) of 2,6-difluorobenzonitrile was dissolved in 3 ml of N-methylpyrrolidone was added. Then, the reaction was carried out again at 200° C. for one hour. After the completion of the reaction, the reaction product was cooled to room temperature to obtain 30 g of powder of polymer (yield 96%). As the results of measurements, IR analysis, solvent resistance and flame retardancy were found to be the same as in Example 1. Respective properties of the polymer are shown in Table 1.

TABLE 1

| | | Thermal properties | | | | | |
|---|---|---|---|---|---|---|---|
| | | Glass | | Heat decomposition | Mechanical properties | | |
| | Reduced viscosity (dl/g) | transition temperature Tg (°C.) | Melting point Tm (°C.) | initiating temperature Tg (°C.) | Yield strength (Kg/cm$^2$) | Breaking strength (Kg/cm$^2$) | Tensile modulus (Kg/cm$^2$) | Elongation (%) |
| Example 1 | 0.91 | 148 | 340 | 484 | 1,400 | 1,320 | 32,000 | 60 |
| Example 2 | 0.86 | 146 | 345 | 481 | 1,350 | 1,300 | 31,000 | 50 |
| Example 3 | 1.01 | 148 | 345 | 486 | 1,450 | 1,320 | 32,000 | 50 |
| Example 4 | 0.45 | 144 | 343 | 475 | 950 | 900 | 30,000 | 20 |
| Example 5 | 1.25 | 148 | 345 | 486 | 1,450 | 1,350 | 32,000 | 25 |

[EXAMPLE 6]

Titanium dioxide with an average particle size of 20 mμ was mixed as a crystallizing nucleator in an amount of 1.5 parts by weight based on 100 parts by weight of the powder of the polymer obtained in Example 5, and the mixture was kneaded at 350° C. for 5 minutes. The pellet of the kneaded product obtained was injected at 380° C. by an injection molder, and a molded product was obtained in a mold maintained at 120° C. Then, by using this molded product, the crystallization degree was measured by X-ray diffraction method. Also, the heat distortion temperature was measured according to ASTM-D-648. These results are shown in Table 2.

[EXAMPLE 7]

The same procedure as in Example 6 was repeated except for mixing γ-alumina with an average particle size of 20 mμ as a crystallizing nucleator in an amount of 1.5 parts by weight based on 100 parts by weight of the powder of the polymer obtained in Example 5. The crystallization degree and the heat distortion temperature of the polymer in this case are shown in Table 2.

[REFERENCE]

The polymer obtained in Example 5 was molded at a mold temperature of 180° C. without adding crystallizing nucleator. The results are shown in Table 2.

TABLE 2

| | Crystallizing nucleator | Mold temperature | Crystallization degree (%) | Heat distortion temperature (°C.) |
|---|---|---|---|---|
| Example 6 | TiO$_2$ | 120 | 35 | 300< |
| Example 7 | Al$_2$O$_3$ | 120 | 30 | 300< |
| Reference | — | 180 | 30 | 300< |

[EXAMPLE 8]

(1) Preparation of Polycyanoaryl Ether

In a separable flask of 5-liter inner volume equipped with a stirrer, a fractionating device and an argon gas introducing pipe, 237.74 g of 2,6-dichlorobenzonitrile, 154.14 g of resorcin, 203.16 g of potassium carbonate, and, as a solvent, 2 liter of N-methylpyrrolidone and 1 liter of toluene were charged. While blowing argon gas, the temperature of the mixture was elevated to 195° C. over 1 hour and at this temperature, the mixture was allowed to react for 3 hours. After completion of the polymerization reaction, the product was cooled and pulverized by use of a blender produced by Warning Co., followed by washing once with 5 liter of water containing 5 g of oxalic acid, three times with 5 liter of water and further once with 5 liter of methanol. As a result, 274 g of a polymer was obtained.

This polymer was found to have a reduced viscosity ηsp/c) of 1.05 dl/g. As for the thermal properties of this polymer, it had a glass transition temperature of 145° C., a melting point of 340° C. and a thermal decomposition initiating temperature of 495° C. (in air).

(2) Molding and Stretching of Film

The polymer obtained in the above (1) was fed into an extruder and extruded at 360° C. to be pelleted. The pellets were press molded at 360° C. and quenched to obtain a transparent film with a thickness of 0.3 mm and both of a length and a width of 120 mm. This film was subjected to free end monoaxial stretching at 170° C. so that a stretching ratio was four times. Next, this stretched film was thermally fixed at 260° C. for 1 minute under tension. The mechanical properties of the monoaxially stretched film thus obtained are shown in Table 3.

[EXAMPLE 9]

A stretched film was molded in the same manner as in Example 8 except for effecting simultaneous biaxial stretching so that a stretching ratio was three times in both longitudinal direction and lateral direction at a stretching temperature of 180° C. and setting a thermal fixing temperature at 270° C. The mechanical properties of the biaxially stretched film thus obtained are shown in Table 3.

[EXAMPLE 10]

A polycyanoaryl ether was obtained in the same manner as in Example 8 (1) except for setting a polymerization reaction time for 2.5 hours. This polymer had a reduced viscosity of 0.75 dl/g and the thermal properties thereof were the same as those of the polycyanoaryl ether in Example 8. Next, a film was stretched and molded in the same manner as in Example 8 (2) except for effecting simultaneous biaxial stretching so that a stretching ratio was twice in both longitudinal direction and lateral direction at a stretching temperature of 175° C. The mechanical properties of the biaxially stretched film thus obtained are shown in Table 3.

[COMPARATIVE EXAMPLE 1]

A polycyanoaryl ether was obtained in the same manner as in Example 8 (1) except for setting a polymerization reaction time for 1.5 hours. This polymer had a reduced viscosity of 0.4 dl/g. Then, the molding and stretching of a film were carried out in the same manner as in Example 8 (2). In the course of the monoaxial stretching at a stretching temperature of 160° C., the film was cut off and therefore the stretched film could not be obtained.

[COMPARATIVE EXAMPLE 2]

The same procedures were carried out in the same manner as in Example 8 except for effecting simultaneous biaxial stretching so that a stretching ratio was 1.2 times in both longitudinal direction and lateral direction. The mechanical properties of the biaxially stretched film thus obtained are shown in Table 3.

[COMPARATIVE EXAMPLE 3]

The mechanical properties of the unstretched transparent film obtained by the same method as in Example 8 are shown in Table 3.

TABLE 3

| | Reduced viscosity (dl/g) | Stretching ratio (times) | Breaking strength (kg/cm$^2$) | Elongation (%) | Modulus (kg/cm$^2$) |
|---|---|---|---|---|---|
| Example 8 | 1.05 | 4 | 5000 | 20 | 76000 |
| Example 9 | 1.05 | 3 × 3 | 2900 | 35 | 46000 |
| Example 10 | 0.75 | 2 × 2 | 2100 | 15 | 40000 |
| Comparative example 1 | 0.40 | — | — | — | — |
| Comparative example 2 | 1.05 | 1.2 × 1.2 | 1400 | 40 | 32000 |
| Comparative example | 1.05 | 0 | 1300 | 45 | 30000 |

[EXAMPLE 11]

Into the polycyanoaryl ether obtained in the same procedures in Example 8, carbon fiber (produced by Toray K.K.; trademark: TORECA) having a thread diameter of 9 μm, an average fiber length of 3 mm and an aspect ratio of 250 was incorporated as a fibrous reinforcing material so as to be contained in an amount of 10% by weight, followed by mixing with use of a Henschel mixer. Thereafter, the mixture was kneaded and extruded at a cylinder temperature of 340° to 360° C. with use of an extruder having a diameter of 30 mm to form pellets. With use of an injection molding machine, a test piece was formed by using the resinous composition pellets obtained at a cylinder temperature of 350° to 370° C. and a mold temperature of 180° C. By use of this test piece, tensile testing and measurements of heat distortion temperature were conducted. The tensile testing was carried out with use of an autograph IS-5000 manufactured by Shimazu Seisakusho K. K. to measure the breaking strength, the breaking elongations and the modulus, respectively, under the tensile rate of 1 mm/min. The heat distortion temperature was measured with use of a thermal deformation measuring device manufactured by Toyo Seiki K.K.

Measurement results of the foregoing are shown in Table 4.

[EXAMPLES 12 AND 13]

Test pieces were produced and tested in the same manner as in Example 11, except that the amounts of the fibrous reinforcing material to be mixed were 20% by weight and 30% by weight, respectively. These results are shown in Table 4.

[EXAMPLES 14 TO 16]

Test pieces were produced and each test was carried out in the same manner as in Example 11, except that glass fiber (produced by Asahi Fiber Glass K.K.) having an average fiber length of 3 mm was used as the fibrous reinforcing material in place of the carbon fiber. The amounts of the glass fibers to be mixed were 10, 20 and 30% by weight, respectively. These results are shown in Table 4.

TABLE 4

| | Fibrous reinforcing material | | Tensile characteristics | | | Heat distortion temperature (°C.) |
|---|---|---|---|---|---|---|
| | Kind | Proportion to be mixed (% by weight) | Breaking strength (kg/cm$^2$) | Breaking elongation (%) | Modulus (kg/cm$^2$) | |
| Example 11 | Carbon fiber | 10 | 1800 | 6 | 55000 | 220 |
| Example 12 | " | 20 | 1900 | 4 | 90000 | 290 |
| Example 13 | " | 30 | 2100 | 4 | 150000 | 300< |
| Example 14 | Glass fiber | 10 | 1700 | 7 | 50000 | 200 |
| Example 15 | " | 20 | 1850 | 4 | 100000 | 280 |
| Example 16 | " | 30 | 2100 | 3 | 120000 | 300< |
| Comparative example 4 | — | — | 1400 | 40 | 33000 | 140 |

[EXAMPLE 17]

(1) Preparation of Polycyanoaryl Ether

In a reactor of 100-liter inner volume equipped with a stirrer, a fractionating device and a nitrogen gas blowing pipe, 5.211 kg of dichlorobenzonitrile, 3.3 kg of resorcin, 4.27 kg of potassium carbonate, 430 g of lithium carbonate, and, as a solvent, 4.3 liter of N-methylpyrrolidone and 2 liter of toluene were charged and stirred at room temperature for one hour while blowing argon gas. Then, the temperature of the mixture was elevated to 195° C. and the reaction was effected for 3.5 hours. After completion of the reaction, the reaction product was thrown into methanol to separate a polymer. The polymer was pulverized by use of a High speed mixer, followed by washing three times with 100 liter of water and twice with 100 liter of methanol and then drying to obtain 6.15 kg of a polycyanoaryl ether (yield: 95%).

This polymer was found to have a reduced viscosity (ηsp/c) of 0.81 dl/g.

(2) Preparation of Thermoplastic Resinous Composition

Polycarbonate (produced by Idemitsu Petrochemical Co., Ltd. : Idemitsu Polycarbonate A2500) as a thermoplastic resin and the polycyanoaryl ether obtained in the above (1) were mixed so that the amount of the polycarbonate to be mixed was 50% by weight based on the total amount of the thermoplastic resinous composition. The mixture was melt kneaded at 350° C. for 3 minutes and then extruded by use of an extruder with an inner diameter of 30 mm to form pellets. With use of these pellets, a test piece was injection molded and heat distortion temperature was measured according to ASTM-D-648. Then, as to flame retardancy, oxygen index was measured according to ASTM-D-286. These results are shown in Table 5.

[EXAMPLES 18 TO 22]

A thermoplastic resinous composition was prepared and heat distortion temperature and oxygen index were measured in the same manner as in Example 17 except for mixing the polycyanoaryl ether prepared in Eample 17 (1) with polyether ether ketone (produced by Imperial Chemical Industry Co.: trademark, Victrex 45G); polyethersulfone (produced by Imperial Chemical Industry Co.: trademark, Victrex 200p); polyphenylene sulfide (produced by Philips Petroleum Co.: trademark, Ryton P-4); glass fiber (produced by Asahi Fiber Glass K.K.: PX-1) and titanium dioxide; polyethylene terephthalate (produced by Du Pont Far East Co.: trademark, Lynite 55), glass fiber and titanium dioxide; and polyether ether ketone and carbon fiber (produced by Toray K.K.: trademark, TORECA) at a proportion indicated in Table 5. The results are shown in Table 5.

[COMPARATIVE EXAMPLES 5 TO 10]

Concerning the composition in which polycarbonate, polyether ether ketone and polyethersulfone employed in Examples 17 to 22, the polycyanoaryl ether itself prepared in Example 17 (1), and polyphenylene sulfide and glass fiber were mixed at a proportion indicated in Table, the composition in which polyethylene terephthalate and glass fiber were mixed at a proportion indicated in Table, and the composition in which polyether ether ketone and carbon fiber were mixed at a proportion indicated in Table 5, heat distortion temperature and oxygen index were measured. The results are shown in Table 5.

At this stage, the formulated proportion of the polycyanoaryl ether was set at 80% by weight and that of the carbon fiber mat at 20% by weight.

Subsequently, the mold was closed and, under pressurization of 10 kg/cm$^2$ G, press molding was carried out at 390° C. for 5 minutes, and thereafter the mold was transferred into a cooling press, in which it was maintained at 240° C. for 5 minutes to obtain a laminated product with a thickness of 1 mm and both of a length and a width of 50 mm.

For the laminated product obtained, tensile strength, elongation, tensile modulus, flexural strength and flexural modulus and heat distortion temperature were measured. These results are shown in Table 6.

Also, when the chemical resistance of this laminated product was examined, it was found to be insoluble in respective solvents of acetone, toluene, xylene, chloroform, methylene chlorided and concentrated sulfuric acid.

Also, as for the flame retardancy, when a strip of the laminated product was subjected to the flame of a lighter for 10 seconds and thereafter the flame was moved away, the fire was extinguished soon and no melt dripping was observed. Flame retardancy was good.

[EXAMPLE 24]

A laminated product was prepared in the same manner as in Example 23 except for using, as a fibrous reinforcing materal, a glass long fiber mat (CSM-M9600, produced by Asahi Fiber Glass Co.) in place of a carbon fiber mat. Then, its evaluation test was carried out. The results are shown in Table 6. Further, the chemical resistance and flame retardancy were found to be the same as those of Example 23.

TABLE 5

| | Thermoplastic resin | | Proportion of polycyanoaryl ether to be mixed (% by weight) | Proportions of fibrous reinforcing material and inorganic filler to be mixed (% by weight) | | Heat distortion temperature (°C.) | Oxygen index (—) |
|---|---|---|---|---|---|---|---|
| | Kind | Proportion to be mixed (% by weight) | | | | | |
| Example 17 | Polycarbonate | 50 | 50 | — | — | 146 | 39 |
| Comparative example 5 | Polycarbonate | 100 | — | — | — | 131 | 30 |
| Example 18 | Polyether ether ketone | 50 | 50 | — | — | 150 | 43 |
| Comparative example 6 | Polyether ether ketone | 100 | — | — | — | 145 | 35 |
| Example 19 | Polyethersulfone | 50 | 50 | — | — | 160 | 43 |
| Comparative example 7 | Polyethersulfone | 100 | — | — | — | 205 | 38 |
| Example 20 | Polyphenylene sulfide | 35 | 35 | GF TiO$_2$ | 28 2 | 300 | 60 |
| Comparative example 8 | Polyphenylene sulfide | 60 | — | GF | 40 | 260 | 50 |
| Example 21 | Polyethylene terephthalate | 35 | 35 | GF TiO$_2$ | 28 2 | 290 | 58 |
| Comparative example 9 | Polyethylene terephthalate | 70 | — | GF | 30 | 224 | 41 |
| Example 22 | Polyether ether ketone | 35 | 35 | CF | 30 | >300 | 62 |
| Comparative example 10 | Polyether ether ketone | — | 100 | — | — | 150 | 44 |

GF: Glass fiber
CF: Carbon fiber

[EXAMPLE 23]

After the powder of polycyanoaryl ether obtained in the same procedure as in Example 8 was dispersed uniformly in a flat plate mold of 50 mm×50 mm, a carbon fiber mat (Toreca mat B0030, produced by Toray K.K.) was placed thereon, followed further by uniform dispersion of the polycyanoaryl ether powder on this mat.

[EXAMPLE 25]

A laminated product was prepared in the same manner as in Example 23 except for formulating, as a fibrous reinforcing material, carbon fibers with an average fiber length of 3 mm so that it is contained in an amount of 10% by weight, in place of a carbon fiber mat. Then, its evaluation test was carried out in the same manner as in Example 23. The results are shown in Table 6. Further, the chemical resistance and flame retardancy were found to be the same as those of Example 23.

[COMPARATIVE EXAMPLE 11]

A laminated product was prepared in the same manner as in Example 23 except for using pellets of a polyether ether ketone (Vitorex 45G, produced by Imperial Chemical Industry Co.) in place of the polycyanoaryl ether, and its evaluation tests were conducted. The results are shown in Table 6. The chemical resistance and flame retardancy were found to be the same as those in Example 1.

TABLE 6

|  | Tensile strength (kg/mm²) | Elongation (%) | Tensile modulus (kg/mm²) | Flexural strength (kg/mm²) | Flexural modulus (kg/mm²) | Heat distortion temperature (°C.) |
| --- | --- | --- | --- | --- | --- | --- |
| Example 23 | 32 | 3 | 640 | 35 | 1100 | 300 |
| Example 24 | 30 | 3 | 600 | 30 | 1000 | 305 |
| Example 25 | 43 | 3 | 680 | 39 | 1200 | 300 |
| Comparative example 11 | 21 | 3 | 530 | 25 | 1000 | 300 |

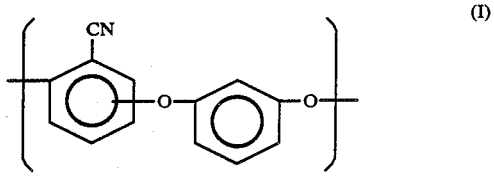

(I)

and having a reduced viscosity ($\eta sp/c$) of 0.3 d/g or more at 60 C. in a solution of a concentration of 0.2 g/dl in p-chlorophenol as a solvent, as a main component, and 10 to 90% by weight of a thermoplastic resin.

2. The resinous composition according to claim 1, wherein the thermoplastic resin is at least one selected from the group consisting of polycarbonate, polyethylene terephthalate, polybutylene terephthalate, polyether ketone, polysulfone, polyetherimide, and polyphenylene sulfide.

3. The resinous composition according to claim 1 wherein the thermoplastic resin comprises polyether ether ketone.

4. The resinous composition according to claim 1 wherein the thermoplastic resin comprises polyethersulfone.

5. The resinous composition according to claim 1 wherein the thermoplastic resin comprises polyamidoimide.

We claim

1. A resinous composition comprising 10 to 90% by weight of a polycyanoaryl ether containing a recurring unit represented by the formula:

* * * * *

UNITED STATES PATENT AND TRADEMARK OFFICE
CERTIFICATE OF CORRECTION

PATENT NO. : 4,853,443
DATED : August 1, 1989
INVENTOR(S) : MATSUO et al

It is certified that error appears in the above-identified patent and that said Letters Patent is hereby corrected as shown below:

Title Page: [75] Inventors: Delete "Tomoyoshi Murakami;
                                      Thoru Bando, all of".

Title Page: [30] Foreign Application Priority Data, delete:

```
"Mar. 25, 1986 [JP] Japan ....... 61-64746
 Apr. 10, 1986 [JP] Japan ....... 61-81066
 Jun. 23, 1986 [JP] Japan ....... 61-144917
 Jun. 23, 1986 [JP] Japan ....... 61-144918
 Jul.  1, 1986 [JP] Japan ....... 61-152626".
```

Signed and Sealed this

Twenty-third Day of April, 1991

*Attest:*

HARRY F. MANBECK, JR.

*Attesting Officer*   *Commissioner of Patents and Trademarks*